Patented Feb. 27, 1945

2,370,439

UNITED STATES PATENT OFFICE 2,370,439

LEAD ALLOY

George F. Beard, Toronto, Ontario, Canada, assignor to National Lead Company, New York, N. Y., a corporation of New Jersey No Drawing. Application March 26, 1943, Serial No. 480,658

3 Claims. (Cl. 75—166)

The present invention relates to a lead alloy which is useful as a filler or shaping material, for example, in the manufacture and/or repair of automotive vehicles.

"Filling metal" as it is called in the trade is a composition which is useful for many purposes. It is especially adapted for filling in dents and declivities in automobile bodies, doors and fenders, and in filling in spaces between parts of the vehicle. When so used the composition is first melted and as it cools to within its plastic range, worked in the dent or declivity by the repairman with a tool called by such workmen "a paddle." The "plastic range" of a filling metal may be defined as the temperature spread between completely liquid state and the completely solid state and is sometimes referred to as the temperature differential between liquidus and solidus. Thus, a filling metal composition is said to have a narrow plastic range when there is a relatively small temperature change between the liquid and solid state of the solder and, conversely, when a filling metal possesses a relatively high temperature differential between the liquidus and the solidus it is said to have a "wide plastic range." The working of the filling metal is accomplished while it is passing from the liquid to solid state in which condition it is in the form of a mush, or putty-like mass. Upon solidifying the filling metal is found firmly adhering to the metal surface to which it is applied presenting a smooth, even surface suitable for painting or other coating finish.

Among the properties which a filling metal must possess in order to be acceptable to the trade may be mentioned: First, a plastic range sufficiently broad to permit proper working; second, good adherence to the surface to which it is applied, sometimes called "strength of bond" (the adherence is generally facilitated by "tinning" the metal surface); third, it must have, when solidified, a smooth, even surface suitable to receive coating compositions; fourth, during its application and after being applied, it must not crumble, or crack, or break off in pieces from the work.

In order to secure the above noted desired properties the prior art had recourse to high tin-containing solders, one of the most satisfactory compositions consisting essentially of as much as 40% tin and about 60% lead. The use of so much tin is rather expensive and when tin is scarce or unobtainable, causes considerable inconvenience in the manufacture and repair of automotive vehicles. The compositions of the present invention possess all the essential characteristics necessary for a satisfactory filling metal while at the same time dispensing with the use of large amounts of tin.

Hence, it is the principal object of the present invention to provide a satisfactory filling metal containing only a minimum of tin. This and other objects will be apparent from this description of the present invention.

In its broadest aspect the filling metal composition of the present invention comprises a lead alloy containing small amounts of arsenic, antimony, copper and less than 5.0% of tin, and the balance lead. It has been found, according to the invention, that when the content of antimony is between about 2.0% and about 7.0%, preferably between about 5.0% and 5.50%, the arsenic content between about 0.04% and about 0.1%, preferably between about 0.05% and 0.08%, the copper content between about 0.02% and about 0.07%, preferably between about 0.04% and about 0.06%, the tin content between about 1.0% and about 4.0%, preferably between about 2.75% and about 3.25%, and the balance lead, the resulting alloy is excellently adapted for the purposes of a filling metal. A composition containing about 3.0% tin, 5.25% antimony, 0.07% arsenic, 0.05% copper and the balance lead is especially recommended.

The filling metal of the present invention will possess a plastic range of about 70° F., being solid at about 500°–510° F. and liquid at about 570°–580° F. It may be applied to tinned or untinned surfaces, although tinned surfaces are preferred. It has excellent plastic working properties and when solid has a beautiful smooth surface suitable for receiving a finishing coat. The strength of bond of this filling metal is excellent and it does not crumble, break or chip off the work to which it is applied.

In the preparation of the lead alloy compositions of the present invention, the several ingredients may be melted together in a suitable vessel until a uniform liquid melt is obtained or, the lead being the predominant constituent this ingredient may be first melted and the other ingredients added thereto after which the liquid melt may be poured into molds and allowed to cool. Secondary lead which contains tin and/or so-called "chemical lead" which contains copper may be used in the preparation of the compositions of the present invention. It is desirable, in order fully to develop the desired properties to hold the liquid melt after all ingredients have been combined at a temperature somewhat above the melting point for a short time.

The compositions of the present invention may be employed wherever formerly a body solder containing a high tin content was employed and when so used will be found equally if not more satisfactory.

I claim:

1. As a new composition of matter, a lead alloy suitable for use as a filling metal comprising between about 2.0% and 7.0% antimony, between about 0.04% and about 0.1% arsenic, between about 0.02% and about 0.07% copper, between about 1.0% and about 4.0% tin and the balance substantially all lead.

2. As a new composition of matter, a lead alloy suitable for use as a filling metal comprising between about 5.0% and 5.50% antimony, between about 0.05% and 0.08% arsenic, between about 0.04% and about 0.06% copper, between about 2.75% and about 3.25% tin, and the balance substantially all lead.

3. As a new composition of matter, a lead alloy suitable for use as a filling metal comprising about 5.25% antimony, 0.07% arsenic, 0.05% copper, 3.0% tin and the balance substantially all lead.

GEORGE F. BEARD.